(No Model.)
F. READ.
HANDLE.
No. 605,745. Patented June 14, 1898.
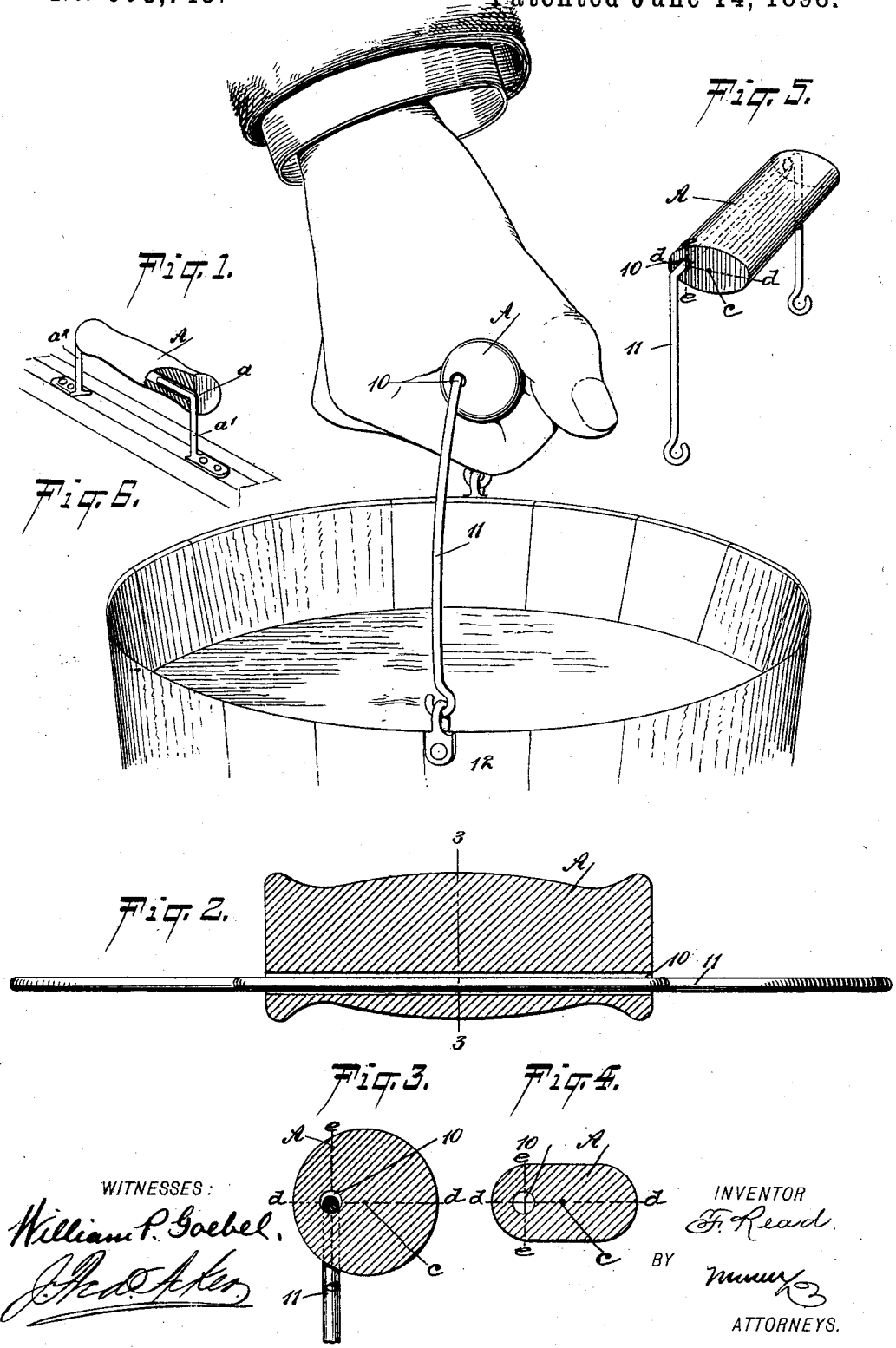

United States Patent Office.

FREDERIC READ, OF BROOKLYN, NEW YORK.

HANDLE.

SPECIFICATION forming part of Letters Patent No. 605,745, dated June 14, 1898.

Application filed October 27, 1897. Serial No. 656,545. (No model.)

*To all whom it may concern:*

Be it known that I, FREDERIC READ, of Brooklyn, in the county of Kings and State of New York, have invented a new and useful Improvement in Handles, of which the following is a full, clear, and exact description.

The object of the invention is to so construct a handle adapted to be used in connection with a bail or like article that the tendency of the handle when grasped and carried will be to remain in or near the palm of the hand and not rest entirely upon the fingers, as is usual in the old form of handle. Thus the weight is not sustained by the fingers, but almost entirely by the palm and adjacent portions of the hand, while the strain incident to carrying a heavy package will be largely sustained by the muscles of the forearm, enabling heavy weights to be transported by hand with comparative ease.

A further object of the invention is to construct an improved form of handle especially adapted for attachment to pails, washtubs, coal-hods, satchels, trunks, and other receptacles and parcels and packages usually carried by one hand.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a perspective view of a vessel to which the improved handle is applied, the handle showing in end elevation. Fig. 2 is a longitudinal vertical section through the handle, showing the relation of the bail thereto. Fig. 3 is a vertical transverse section through the handle, taken practically on the line 3 3 of Fig. 2. Fig. 4 is a transverse section through a handle having a slightly different shape, being oblong in cross-section. Fig. 5 is a perspective view of a package-carrier adapted to be applied to any form of package in which the handle or grip section is oval in cross-section; and Fig. 6 is a longitudinal section through a handle especially adapted for attachment to valises and like articles, showing the application of the invention thereto.

The handle A may be made of any desired material and may be given any cross-sectional shape. The handle, however, no matter what its cross-sectional shape may be, is provided with a longitudinal eccentrically-located opening 10, which is preferably carried from end to end and is adapted to receive the bow portion of a bail 11.

In Fig. 1 a bail 11 for the handle is illustrated as a portion of a pail 12, and in Fig. 5 the bail is so shaped at its terminals that it may readily receive the cord of a wrapped package or the equivalent thereof. When the handle is constructed as above set forth, it fits much more neatly and satisfactorily in the hand when the said handle is grasped, and the handle may be increased in diameter over ordinary handles without in the slightest degree incommoding the person grasping the handle. In fact, the increased diameter of the handle enables said handle to be grasped without exerting undue tension on the fingers or members of the hand.

It will be understood that the opening in the handle need not extend from end to end, but that independent openings may be made in the ends, and an independent carrying member adapted for attachment to an article may be entered in each of said openings, as shown in Fig. 6, in which the handle A has an eccentric opening $a$ at each end, and the bail is made in two members—namely, the member $a'$ and the member $a^2$—the members being arranged each to enter one of the said end openings.

To better explain the geometrical conditions to which the above improved results are due, I have indicated upon Figs. 3, 4, and 5, first, at $c$, the center of the handle; second, at $d\ d$, the diameter passing through the pivot—that is, the line connecting the center $c$ to the center of the opening 10 and prolonged to the surface of the handle—and, third, at $e\ e$, the perpendicular erected at the pivot upon the said diameter $d\ d$. It will be seen that in each case the diameter $d\ d$ is longer than the perpendicular $e\ e$ and that there is a preponderance of material along said diameter on the same side of the eccentric pivot on which the center $c$ is located. Owing to this construction the handle will, when held as shown in Fig 1, assume the position indicated, in which the extent of material measured in a horizontal line upon the diameter $d\ d$ is greater than the vertical dimension $e\ e$. In this position the advantages set forth will be fully secured.

Having thus described my invention, I claim as new and desire to secure by Letters Patent—

A bail, and a handle pivoted thereon eccentrically and having a preponderance of material on the same side of the pivot as the center, the material being so disposed that the diameter through the pivot shall be longer than a line drawn through the handle at the pivot perpendicular to the said diameter, whereby the fingers of the user have a purchase to press inward on said diameter to hold the bail adjacent to the palm.

FREDERIC READ.

Witnesses:
J. FRED. ACKER,
E. B. MARSHALL.